Sept. 29, 1970  R. B. BARNES ETAL  3,531,642
THERMOGRAPHIC SCANNER AND RECORDER
Filed June 14, 1968  8 Sheets-Sheet 1

INVENTORS.
ROBERT BOWLING BARNES
NELSON E. ENGBORG
BY
ATTORNEY

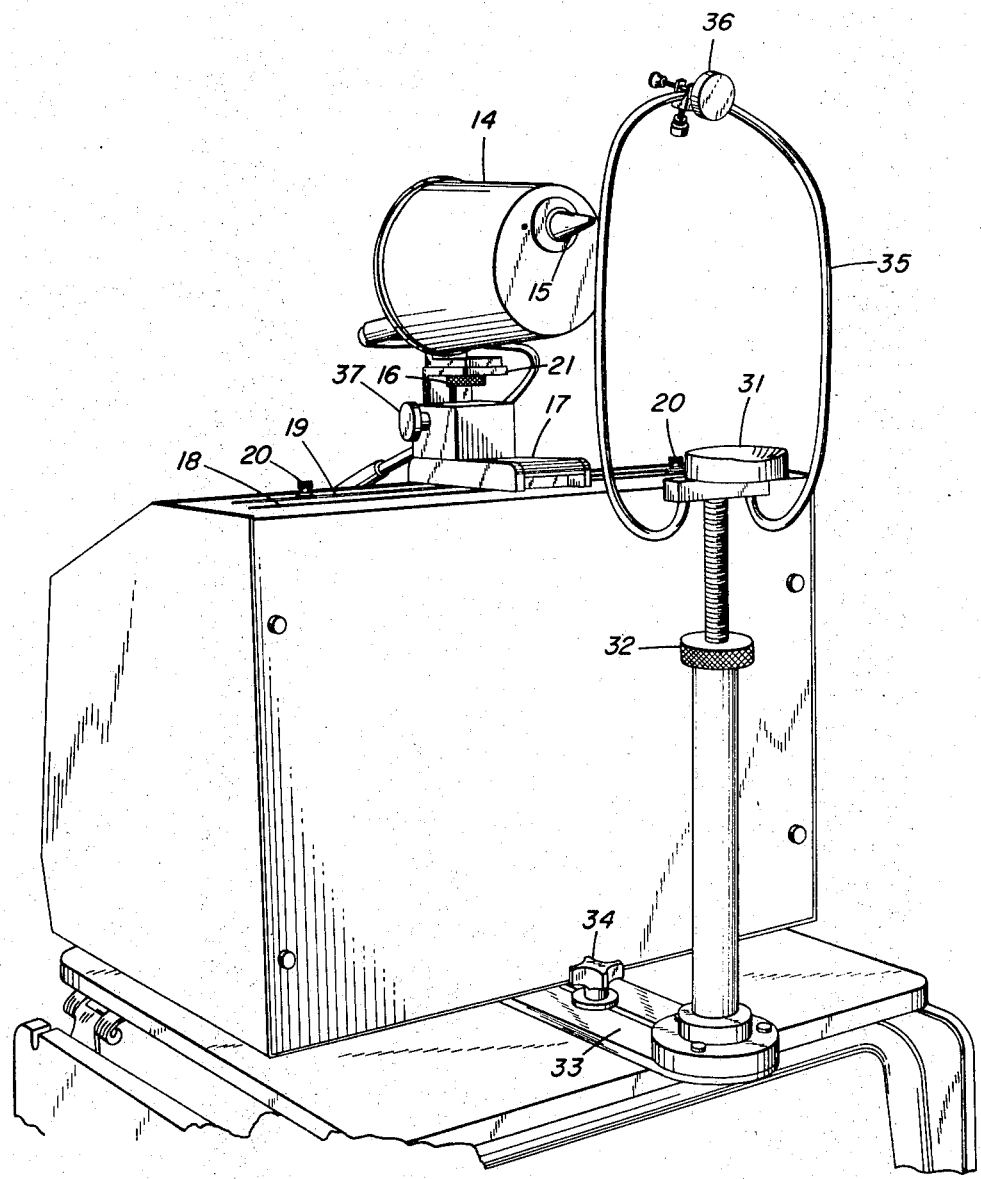

Sept. 29, 1970  R. B. BARNES ETAL  3,531,642
THERMOGRAPHIC SCANNER AND RECORDER
Filed June 14, 1968  8 Sheets-Sheet 5

INVENTORS.
ROBERT BOWLING BARNES
NELSON E. ENGBORG
BY
*Robert ...*
ATTORNEY

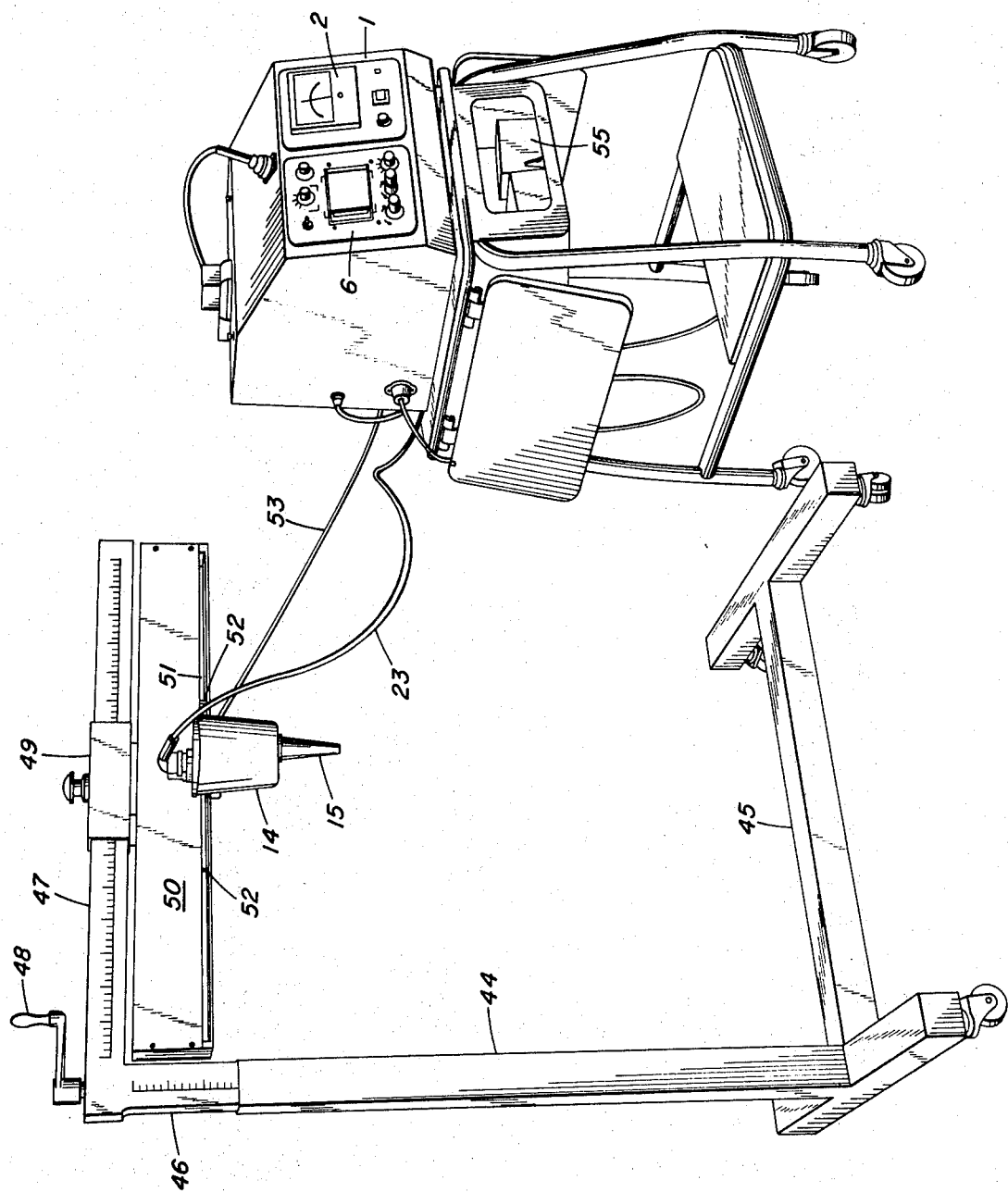

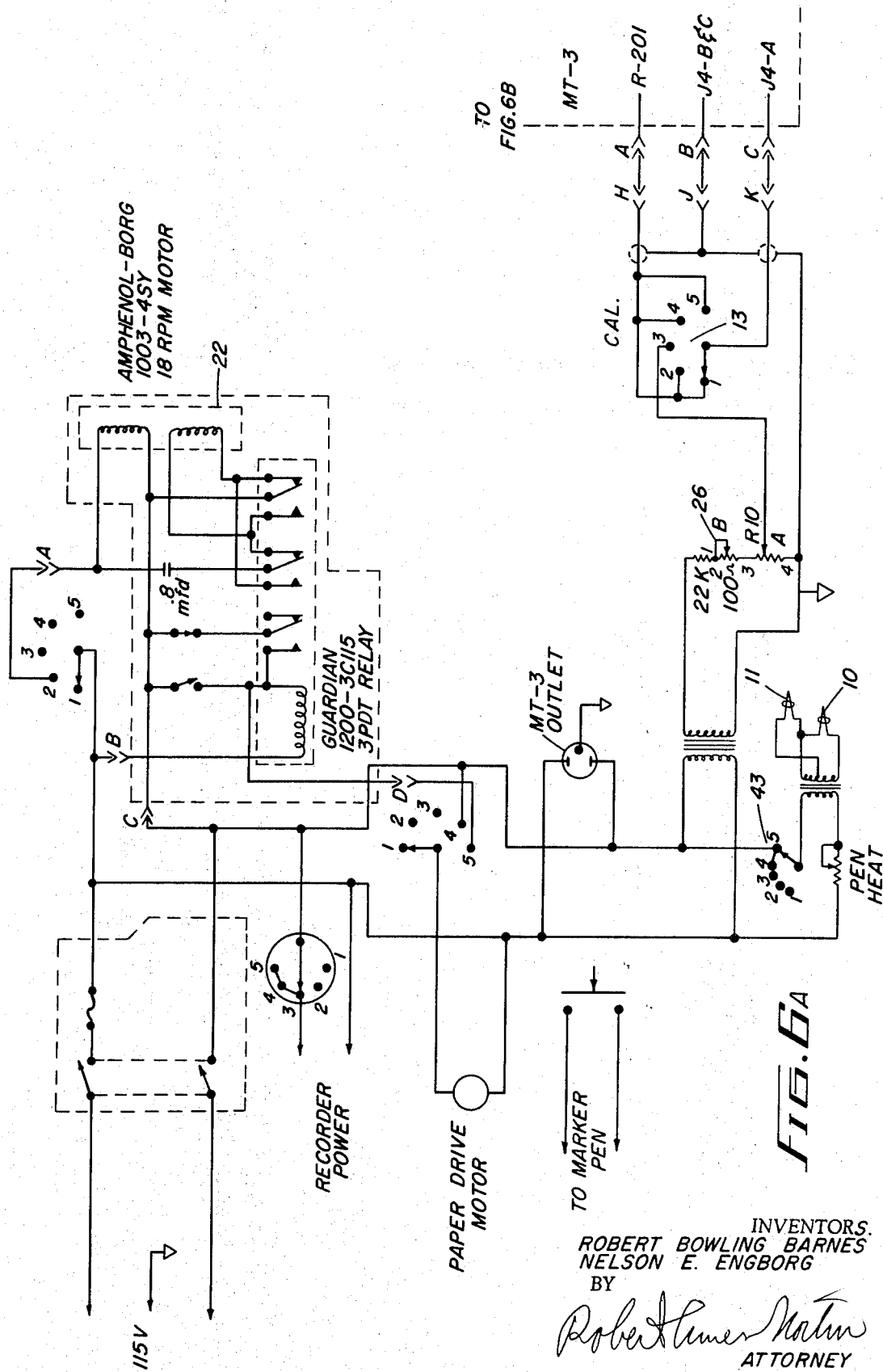

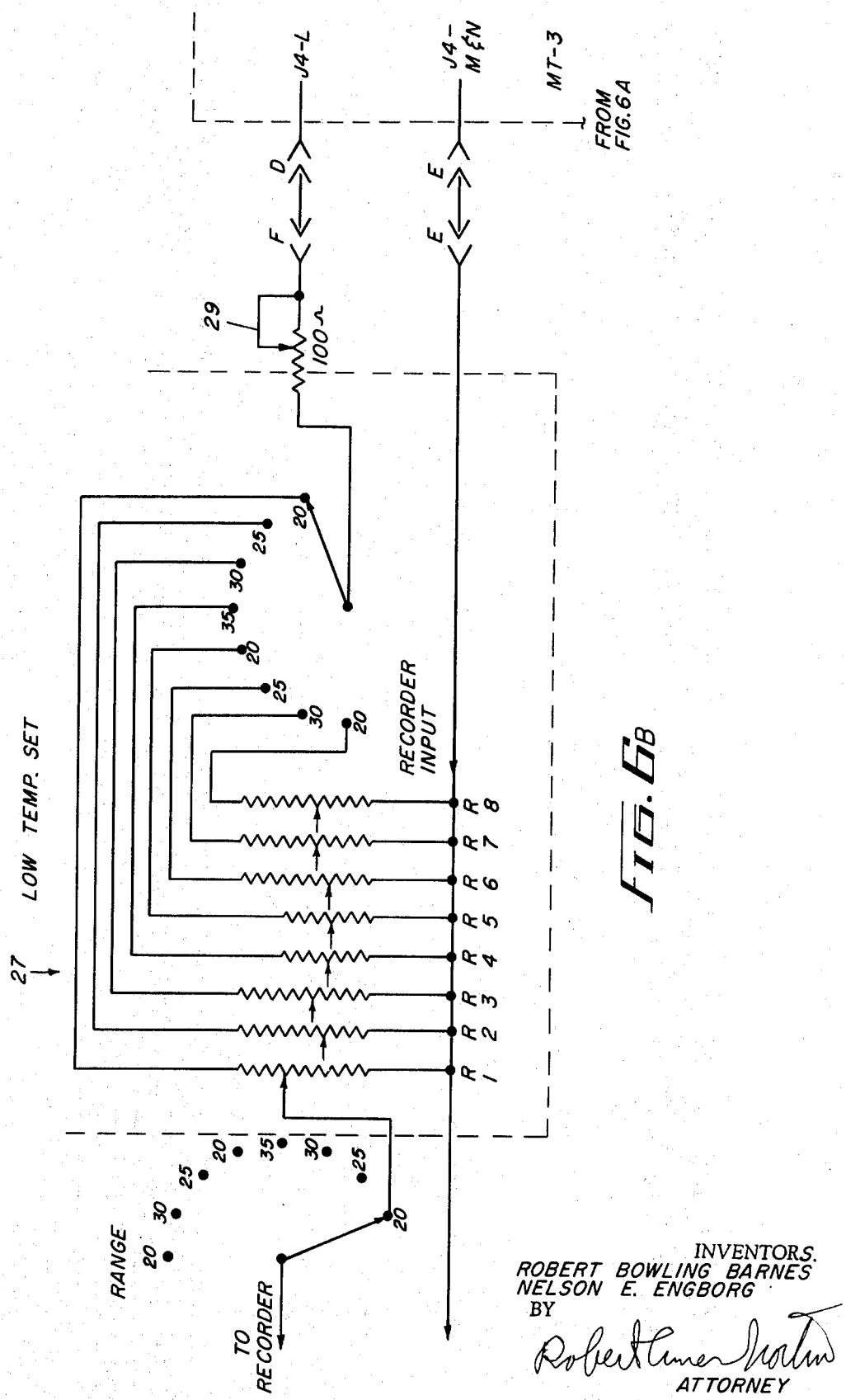

United States Patent Office

3,531,642
Patented Sept. 29, 1970

3,531,642
THERMOGRAPHIC SCANNER AND RECORDER
Robert Bowling Barnes, Stamford, and Nelson E. Engborg, Greenwich, Conn., assignors to Barnes Engineering Company, Stamford, Conn., a corporation of Delaware
Filed June 14, 1968, Ser. No. 737,047
Int. Cl. A61b *6/00;* G01t *1/16*
U.S. Cl. 250—83.3                 8 Claims

ABSTRACT OF THE DISCLOSURE

An improved thermographic scanner and recorder provides an infrared radiometer mounted on a carriage which can be moved back and forth along a predetermined guided path. This permits scanning across a portion of a patient's body, for example a forehead, and is provided with an improved means for recording in graph form the scan, calibrating for particular ranges so that the full width of the recording paper can measure the particular range of temperature or scanning without recording, or moving paper without recording. The compact device permits scanning from the device itself or remote control scanning, and all functions, including calibration functions, utilize the radiometer temperature meter for such functions. When a record is produced, the device also provides for marker signals on the paper to designate certain portions of the scan with respect to the location of the scan on a patient's body.

RELATED APPLICATIONS

This application covers improvements on a basic radiometer scan described in a patent to Robert L. Hood, No. 3,374,354, issued Mar. 19, 1968, which is owned by the assignee of the present invention.

BACKGROUND OF THE INVENTION

Thermography utilizing infrared radiations from a patient's skin is increasingly used as a diagnostic aid in determining the possibility of medical disease, such as certain malignancies and the like. The original thermograms were taken on a thermograph which scanned successive lines, producing a photographic representation of the temperature of the skin of a patient over a particular area. For many purposes such thermograms are the most useful to physicians. A thermograph is a large and expensive machine, and requires skilled operation, particularly in the choice of brightness of the thermogram, contrast, and the like, for best pictures. Extensive success in medical diagnosis has been made possible by thermography. Typical thermographs are those described in the patent to Astheimer and Wormser, No. 2,895,049, and to Barnes, Banca and Engborg, Pat. No. 3,169,189. Thermograms show a picture of a selected region of the patient's skin, the infrared radiations of which are transformed into visible light, and as the infrared detector is scanned, the photograph is in a form reminiscent of a television raster, the warmer portions of the skin being white or lighter gray, and the cooler portions being darker gray or even black.

Recent thermographic diagnoses have been found capable of giving warning of a stroke or apoplexy caused by plugging of one or both carotid arteries. This is best effected by taking a thermogram of a patient's forehead, as the skin over the sinuses responds to relative blood flow from the internal carotid arteries, and so can give warning of a vascular malfunction which eventually can result in one type of apopolexy. Thermography is of course not useful for strokes which result from the rupture of a blood vessel in the brain, but as a majority of non-fatal strokes are caused by artery blockage, it has been very useful in giving warning of this very common form of vascular malfunction.

In the case of strokes which can be predicted from thermography of a patient's forehead, it is not necessary to have a complete picture or thermogram. It is sufficient to scan a single line or relatively few lines along the portion of the patient's forehead in question. It is also possible to use single-scan thermography for other diagnostic purposes. Single-line scan across a woman's breasts can also indicate pregnancy, unless the woman is using certain hormonal oral contraceptives.

It would be possible to make a single line scan with a hand-held infrared radiometer, but this presents a number of problems. In the patent to Hood referred to above, a scanning device is described and claimed in which an infrared radiometer is automatically scanned by moving it back and forth or along a slot or guiding wire. This has represented a great advance in cost, as such a scanner is very much less expensive than a thermograph. The device utilizing a single scan can be used for forehead scanning, and because of its low cost, is available for physicians and clinics who cannot afford the much higher cost of a thermograph. The Hood scanner is used as a unit, and requires the patient to be seated in front of it. Also, precise and variably calibratable recordings are not described.

SUMMARY OF THE INVENTION

The present invention is an improved single-scan device utilizing the principles of the Hood patent and capable in one of its modes of performing all of the functions of the Hood device. In addition, it permits the choice of remote scanning, calibrated recording for predetermined ranges of temperature, removal of records and the like. In other words, while the basic scanning by moving an infrared radiometer back and forth in a predetermined path is retained and is utilized, the present invention is capable of performing a number of other functions which are desirable and convenient. Essentially the present invention provides a central device with recorder, radiometer output meter and the like, and radiometer scanning motion where scanning of a seated person is desired, which is the only mode in which the Hood device is usable. The radiometer head can be removed and used as a hand-held radiometer just as in the Hood device, and in addition can be used for remote control scanning, for example of a patient in a bed or on a table. At the same time, the scan can be recorded in definitely determined calibration ranges without any external calibration, using the meter of the device as a calibration indicator.

It is also possible in a further modification to utilize the device in locations where there is no A.C. power line. In this modification, when the A.C. power line is unplugged, this automatically throws the device onto internal storage battery and inverter operation, and it can be then moved to another location, for example a ward in a hospital, and it is unnecessary to plug in and come to equilibrium in the new location, which would otherwise be a problem, as infrared radiometers which are to give precise responses indicating skin temperature must first be warmed up to normal operating conditions, which takes some time.

All of the functions in the improved device of the present invention can be chosen at will, and will become apparent from a description of typical illustrative embodiments.

BRIEF DESCRIPTION OF THE DRAWINGS

FIG. 3 is a rear elevation of the device showing connections for seated forehead scans and aiming adjustments;

FIG. 5 is an elevation of a connected remote control vertical scan with a recorder;

FIGS. 6A and 6B are diagrams of the electrical circuits, partly in block form and partly in schematic;

DESCRIPTION OF THE PREFERRED EMBODIMENTS

Figure 1:
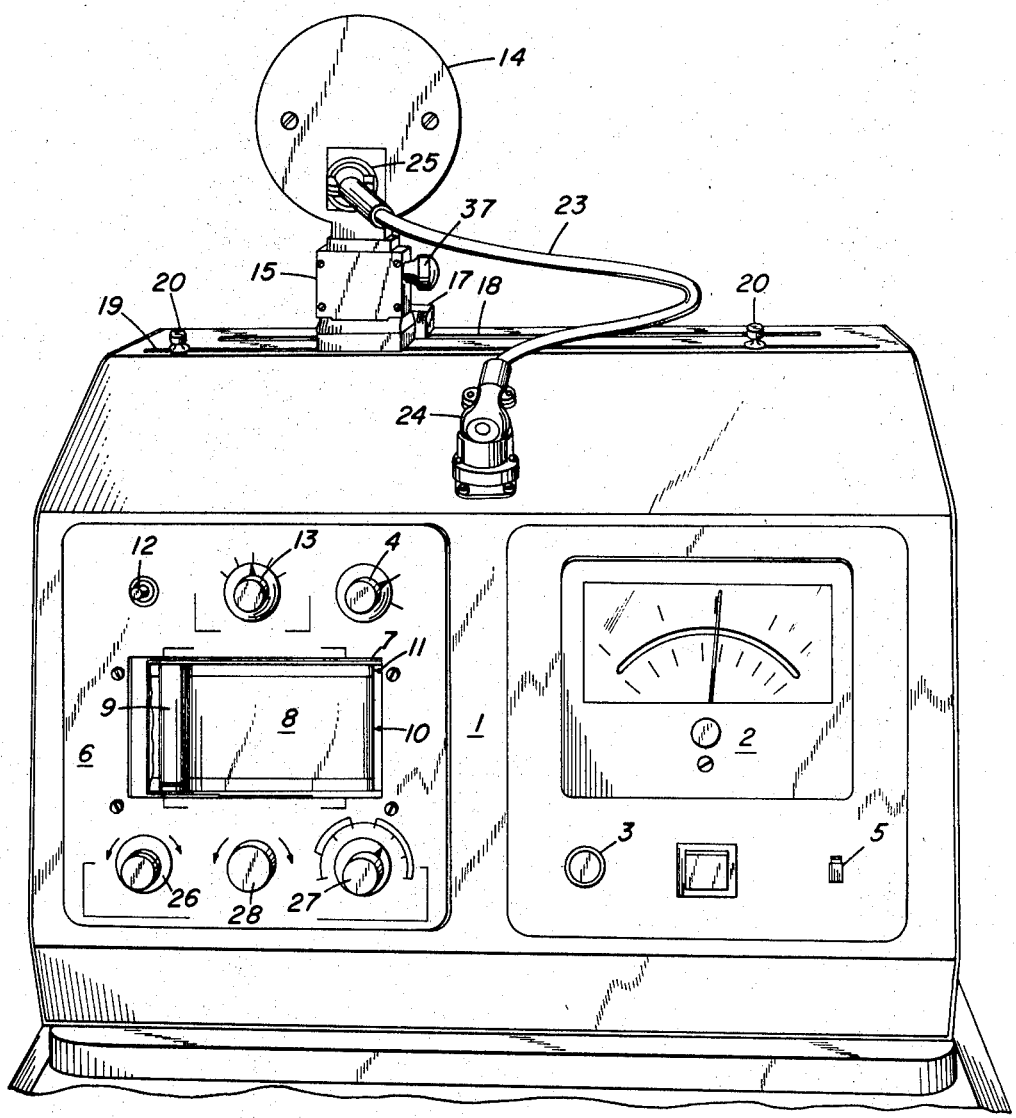
FIG. 1 is an elevation of the device with a scanning radiometer in place on it for seated scans.
Figure 2A:
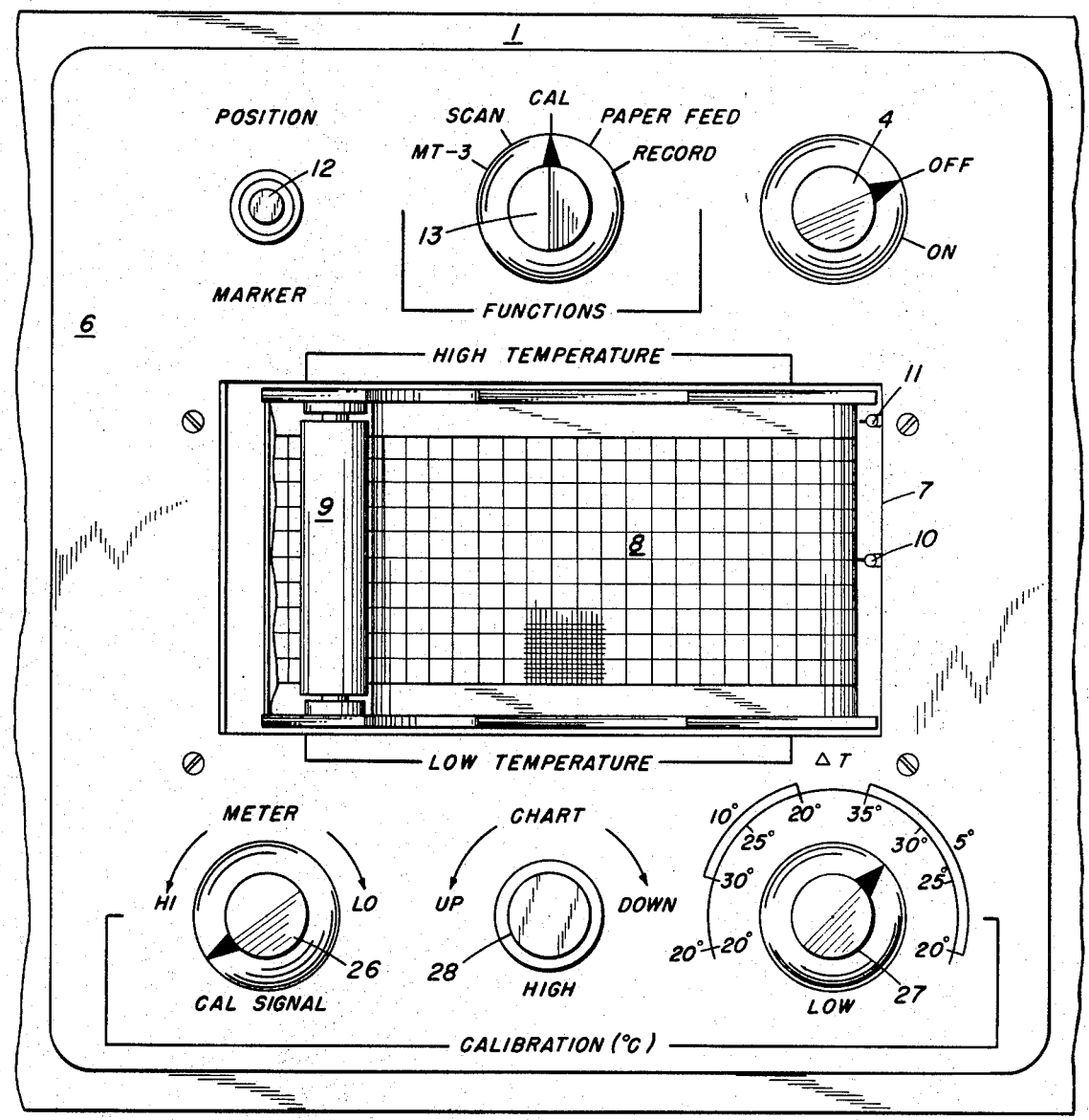
FIG. 2A is an enlarged elevation of front left panel.
Figure 2B:
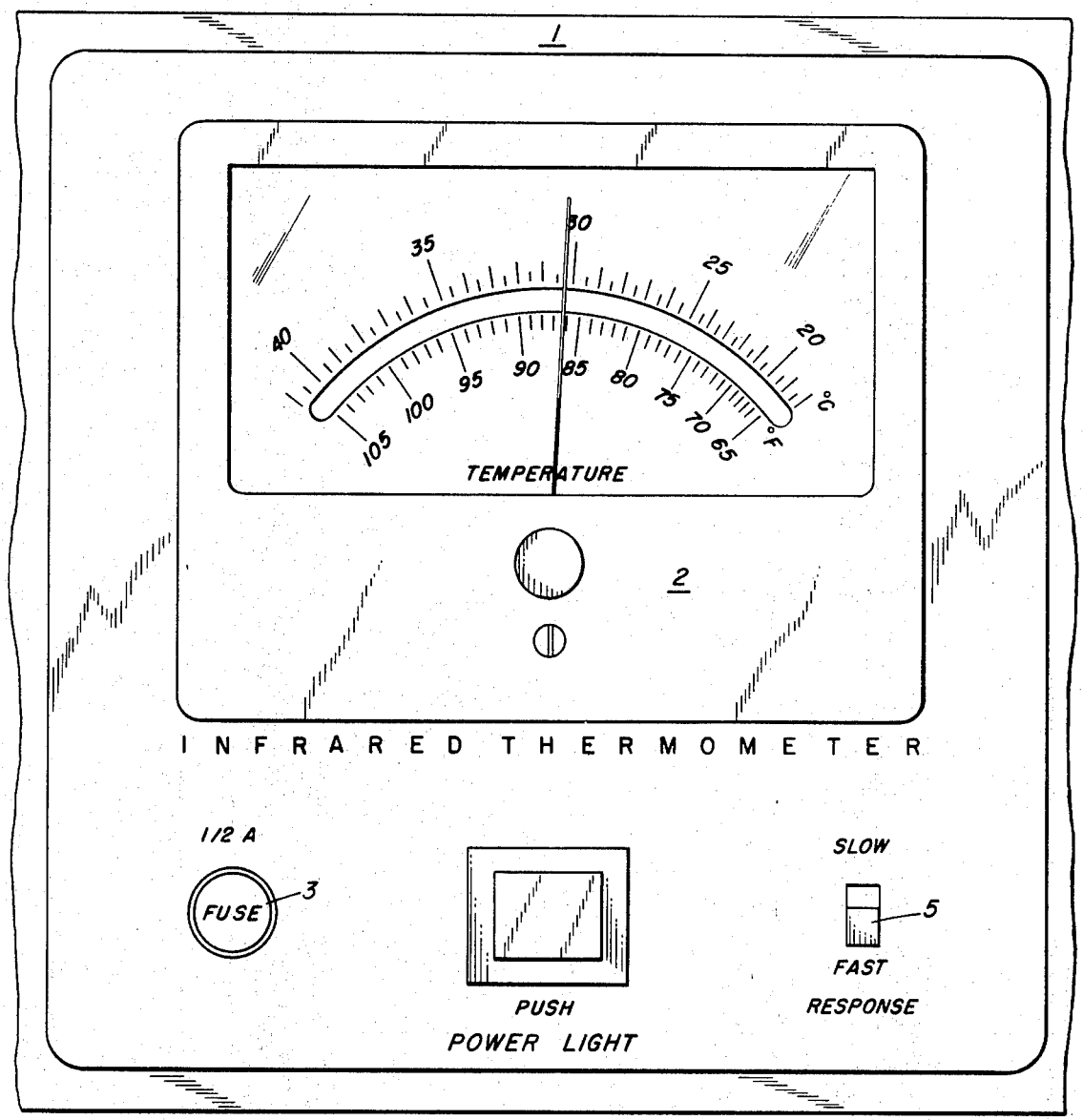
FIG. 2B is an enlarged elevation of front right panel.

FIGS. 1, 2A and 2B show the front of the recording and measuring instrument which is mounted on a table that can be moved on casters. The table mounting appears in FIGS. 3, 4 and 5. The instrument has a front panel 1 with a meter 2 on its right-hand side, below which are located from left to right a fuse 3, an On-Off switch knob 4, and a switch 5 for slow or fast response. In the "Slow" position the recorded curve will have a smoother appearance, since the signal-to-noise ratio is higher in this mode than when the "Fast" position is selected. However, smaller temperature fluctuations during scanning can only be recorded when this "Slow/Fast" switch is in the "Fast" position.

On the left-hand side of the front panel is a plate 6 with a window 7 back of which is located the paper chart 8 passing below a roller 9. To the right is a recording pen 10 and a marking pen 11. As the chart and recorder as a whole is a standard item, only so much of the recorder is shown as is needed to locate the pens and chart with respect to the other elements of the present instrument.

On the same plate 6 there are located three switches at the top, the left-hand 12 being a position marker which, when depressed, causes the pen 11 to make a mark on the upper edge of the chart on the paper. The purpose for this mark will appear when the operation of the machine is described below. As the recorder is a standard item, only the marker and the pen are shown, although certain of the electronic parts of the recorder appear on FIG. 5.

In the center of the top row there is a multi-deck switch 13, the electrical connections for which are shown on FIG. 6A and will be described below. The switch has five positions, as indicated on FIGS. 1, 2A and 5. The left one marked MT-3, connects the infrared radiometer only to the meter. The next position, marked "Scan," actuates the scanning motor for moving the radiometer head from side to side. The third position, marked "Cal," connects a signal generator to the radiometer electronics. The fourth position turns on the paper feed and connects the recorder without scanning, and the final position, marked "Record," causes the paper to move and the recorder and scanning to be actuated.

Figure 4:
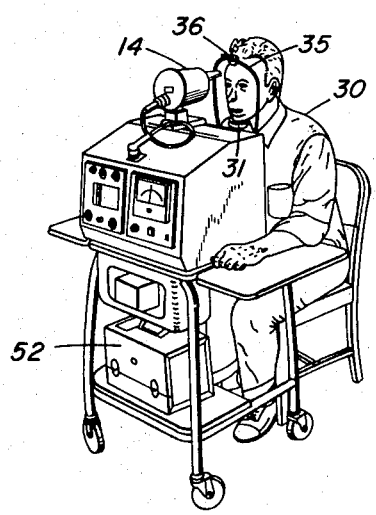
FIG. 4 is an elevation showing a patient in position for a forehead scan.

On the top of the instrument the radiometer is shown at 14 with a suitable field of view defining cone 15, which latter can be seen in FIGS. 3, 4 and 5. The radiometer 14 is attached to a mounting bracket 21 by a clamping screw 16, which bracket can be tilted up in a carriage 17. This is best seen in FIG. 3. The carriage moves in a slot 18 and is scanned backwards and forwards by a standard scanning drive which is the same as in the Hood patent, and is therefore not shown in detail. A narrower slot 19 near the front of the top carries two clampable scan-length positioning stops 20. These stops contact microswitches which control the rotation of the standard scanning motor 22, FIG. 6A. The drive itself is not shown, but the microswitch motor relay connections appear on FIG. 6A.

The radiometer 14 is connected through a short multiwire cable 23 to a connector 24 which mates with a socket on a sloping panel connecting the top of the instrument with the front panel. The other end of the cable is detachably mounted to the radiometer 14 by the connector 25. It will be noted that the connecting cable in FIG. 1 is fairly short, and only sufficient to permit scanning of the radiometer the full length of the slot 18.

The details of the controls on the front panel are best seen in FIGS. 2A and 2B. At the bottom of plate 6 there are located three controls. The left one is a fine/coarse potentiometer 26 marked "Meter." It is provided with a double knob, one controlling the fine adjustment and the other the coarse. This potentiometer is thrown into circuit when the switch 13 is turned to the "Cal" position. It puts onto the meter 2 a signal. The connections, which are self-explanatory, appear on FIG. 6A with a particular switch deck of the switch 13 being shown adjacent to the potentiometer 26.

At the right there is a control 27 which sets ranges. It will be noted that the markings of the control permit setting bottom temperatures for a low range of 5° C. to the right, 10° C. to the upper left, and a single range of 20° in the extreme counterclockwise position. The control 27 is a series of eight potentiometers, the connections of which appear on FIG. 6B, and connect to the recorder input at the left and to the radiometer electronics at the right. In order not to confuse FIG. 6B, the movable sliders on the actual potentiometer resistances are only shown as an arrowhead; the actual movement of the switch itself appears in the various positions to the right and left of the schematic of the potentiometers.

In the center at the bottom of plate 6 there is another potentiometer 28 which moves the recording pen 10. This control serves to set the recording pen at the top of the chart paper at the end of the calibrating operation, which will now be described in connection with a forehead scan.

To start, after the power has been turned on by switch 4, which lights an indicator light, shown at bottom center of FIG. 2B, and the power has been on for a sufficient time so that the radiometer and its accompanying circuits have reached equilibrium, a patient 30 sits in the position shown in FIG. 4. The chin rest 31 is raised by the knurled nut 32 so that the patient's chin rests on it. This adjustment is best seen on FIG. 3. Fore and aft positioning of the chin rest is effected by moving the slotted member 33 which can be clamped in any desired position by the clamp 34. As will be seen from FIG. 4, the patient's face is surrounded by a frame 35 and a headrest 36 is adjusted as can be seen on FIG. 3. The radiometer 14 is raised or lowered by means of a small knob 37. The patient 30 seats himself behind the instrument as shown in FIG. 4. The adjustments which will be described, however, are more clearly shown on FIG. 3. Turning the threaded nut 32 on a sleeve which is mounted on a slide 33 attached to the table top by the bolt 34 causes the chinrest 31 to move up or down until the patient's chin rests comfortably on it. This will be seen in FIG. 4. The adjustable forehead positioner 36 which is touching the forehead of the patient assures that there is a fixed predetermined distance of the patient's forehead from the radiometer 14.

The radiometer 14, with its field-of-view-defining cone 15, is moved up or down so that the cone 15 is properly located adjacent the patient's forehead. This is effected by moving the mounting bracket 21 with the knob 37 in its mounting block. The end of the cone 15 should be quite near the patient's forehead and this can be adjusted as has been described by moving the member 33, clamping in the desired position by the clamp 34.

The function knob 13, FIG. 2A, is turned to the "Scan" position. The two stops 20 are then fastened at the points where the scan of the radiometer 14 is across the patient's forehead and may, if desired, cause the radiometer 14 to move to a point where it would scan background. In the scan position of the knob 13 the output of the radiometer is connected to the meter 2, FIG. 2B, and it can be seen what range of temperature will occur. At this time the marking pen 11, FIG. 2A, can engage the paper by means button 12 at the points on the scan corresponding to the areas of interest. This results in short lines at the top of the paper which are shown in FIG. 8.

The function knob 13 is then turned to the "Cal" position and the Δt range control 27 is set for a range and temperature which will include the temperatures noted on the meter during the scan. In FIG. 2A this is shown as having chosen 30° C. in the 5° C. range. Obviously the top of the range is 35° C., and the meter control potentiometer 26 is then turned until the pointer of the meter 2 registers 35° C. The setting can be made quite precise by using the coarse and fine portions of the potentiometer 26. Now the chart control 28 is turned, which causes the recording pen 10 to move until the recording pen is opposite the top line on the recording paper. If desired, the bottom point of the range, 30° C., can be set on the meter by turning the potentiometer 26. Since in the "Cal" position the meter and recording pen 10 are electronically connected together, the latter moves down, and it can be determined whether the bottom position of the range is accurately set. Ordinarily this is set internally by resistors R1–R8, FIG. 6B, and a common variable resistance 29, and should not vary. The procedure just described is merely for purposes of checking that the fixed bottom adjustment of the range has not been changed.

Figure 8:
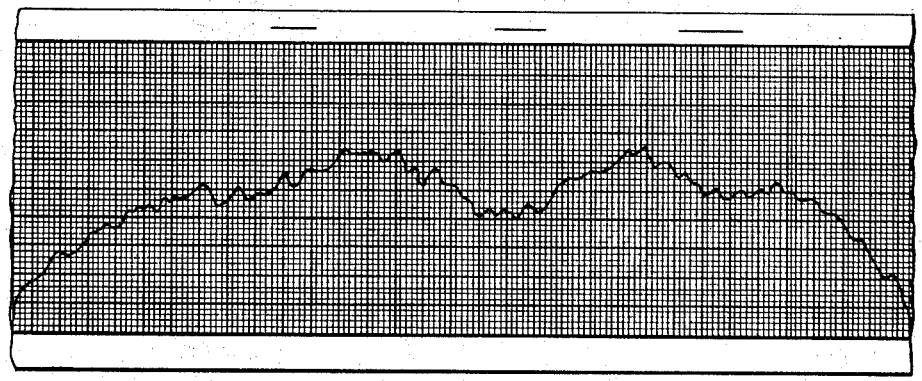
FIG. 8 is a portion of a strip chart.

The function knob 13 is then turned to the "Record" position and a scan across the patient's forehead is then recorded, which will give a record that can be similar to that appearing in FIG. 8, depending on the particular temperatures of the skin of the patient. When the scan is complete, the knob 13 is thrown to the "Paper Feed" position, the paper 8 then feeds under the roller 9 as shown in FIG. 2A until the whole of the record has moved under the roller 9, and can be torn off. In this position the radiometer output is recorded without scanning. This produces a record of a single position on the patient. Sometimes it is desired to record more than one scan. For example, in lines displaced somewhat vertically, the adjustment for the second line is effected as described above, and the step of recording repeated. Usually the range of temperatures in this second scan will not be sufficiently different so that it is necessary to select a different position of the control 27, but in some cases it may be necessary to choose a different range and this is done as described above.

It will be noted that the operation of the instrument in the present invention, as in all thermographs and allied instruments, is in no sense an automatic diagnostic machine. It must be operated by skilled personnel, and the results must be evaluated by a skilled physician. It is not necessary that the scan itself be taken by the physician who makes the final evaluation, but the technician or nurse should be sufficiently skilled so that the proper settings are made of the control 28 and the other controls, and also that points of particular interest are marked by the marker pen 11.

When the physician has evaluated the scans he may wish to have other tests made. For example, he may wish a full thermogram of a patient's forehead, though for this type of diagnosis it will be relatively rare that a full thermogram would give additional information of real importance that is not readily obtainable from the records of the scans. However, he may wish to have another scan taken, parallel to the first scan but displaced slightly, and this can be effected as described above by raising or lowering the bracket carrying the radiometer head by means of the adjustment 37. It is also possible for the physician to ask for another scan with a still larger field of view cone 15 so that the scan will average the temperature over a wider line and sometimes is less affected by surface blood vessels. This can, of course, be done, and is mentioned to indicate the versatility of the instrument for this type of investigation.

Sometimes it is desirable to use a radiometer in a hand-held position by screwing it onto a suitable hand grip. In that case the radiometer is detached from its brackets 21 and held in the hand, and used as such. For such observations the knob 13 should be thrown to the extreme counterclockwise position. The present instrument, therefore, can be used to perform all of the functions of a hand-held radiometer as well as the scanning functions which have been described. It is therefore not necessary to have separate instruments.

The position of knob 13 in extreme counterclockwise position is also sometimes used when it is desired to see whether the patient's forehead has reached a desired equilibrium temperature. For this, of course, it is not necessary to scan, and the stationary position presents certain advantages. As in all thermography, it is necessary that the patient's skin, or the skin over the portion of the body which is to be thermographically examined, should have reached an equilibrium temperature. Otherwise, if the temperature of the skin is changing during the thermography or thermographic scanning, spurious results may be introduced.

Figure 7:
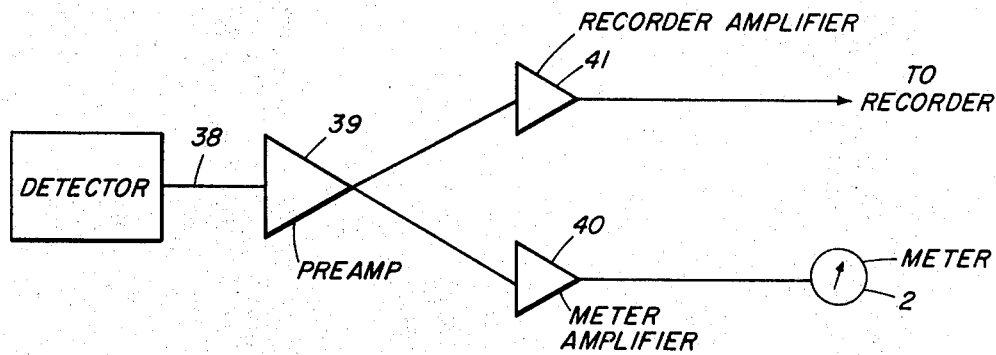
FIG. 7 is a block diagram of the radiometer preamplifiers and amplifiers.

FIGS. 6A and 6B have not been described in exact detail for all of the elements because, for the most part, they represent more or less standard equipment and the circuits are therefore substantially self-explanatory. However, it should be noted that it is undesirable to have the meter across the recorder inputs, as otherwise it can be affected by changes, such as impedance changes in the recording position due to the scanning motor, adjustment of the potentiometers 28, etc. Therefore it is desirable to have the radiometer amplifiers divided into a preamplifier receiving the signal output from the radiometer detector and two parallel final amplifiers, one of which goes to the meter and the other to the input to the recorder controlled by the knob 13. This connection is shown in simplified block diagram in FIG. 7. The wires 38 are from the radiometer detector and are amplified in the preamplifier 39. The preamplified signal is then fed to a meter amplifier 40 and an amplifier 41 which puts out a signal suitable for recorder operation. The output of the amplifier 40 is shown going to the meter 2, in diagrammatic representation, and the output of amplifier 41 goes to the switch 13, which, in the "Call" and "Record" positions, connect to the recorder pen. The deck in question is shown at 43. It should be noted that in actual construction the amplifiers 39, is actually in the radiometer head. It connects, of course, to suitable pins which in turn are connected to the cable.

The description of the calibration and the scanning has assumed that the radiometer was properly adjusted initially. This initial adjustment is made with the radiometer on the bench, the function switch 13 is turned to "Call" and set to give a reading of 20° C. on the meter. At this point the movable arm on the switch shown in the middle of FIG. 5B should read a predetermined voltage, for example 55 mv. If it does not, the resistance 29 is adjusted until it does so. The other potentiometers R1–R8 on the same figure are initially set and are not changed. If it is necessary to adjust these resistances, this can be done in a similar manner with, of course, the proper settings of control 27. Ordinarily this is not necessary, and at most the adjustment of the resistance 29 is all that is needed. Of course if there has to be adjustment of any of the resistances of potentiometers on FIG. 6B, it would be necessary to calibrate the position of the pen 10 as has been described above.

For certain purposes it is desirable to scan portions of a patient while he is lying on a bed or table, and this is shown in FIG. 5, where the portions of the instrument itself, including a longer cable, bear the same reference numerals. The framework 44 with elongated foot 45 which can be slid under a bed or table can be moved on the floor. The upright portion of the framework is hollow, and carries a vertical column 46 which is provided with a horizontal arm 47. A crank 48 or motor serves to raise or lower the column. A carriage 49, clampable by a screw, can slide along the arm 47. This carriage carries a second scanning mechanism 50 which has a slot 51 into which the radiometer head bracket fits. The carriage 49, the scanning mechanism 50 can be turned against moderate friction so that it can scan the radiometer parallel to the arm 47, at right angles to it or at any other desired angle, the mechanism of course being clamped by tightening the clamping screw in the desired position on arm 47. Stops 52, which fit in the slot 51, can be moved in the same manner as the stops 20 in FIGS. 1–3. They perform the same function of tripping microswitches at the end of the scan. The circuit diagram of course is the same as shown in FIG. 6A, the portion controlling the motion of the scanning motor being, of course, duplicated for the scanning mechanism in 50. Power for the scanning motor is taken from the main power of the device through the plug-in cable 53. As this is an ordinary power cable, it is not shown in detail, but can be plugged into a suitable receptacle 56 on the main instrument.

In the case of scanning a patient lying on a bed, the framework 44 is slid under the bed, the crank 47 turned for the desired height, and the clamping screw of carriage 49 loosened and the scanning mechanism 50 slid and turned so that the scan can be in the desired direction. Often for such scans of a person on a bed, a somewhat wider field of view is desirable than for forehead scanning, and so the field of view determining cone 15 is shown on this figure as being somewhat larger.

When the patient is lying on the bed, it may be desirable to scan across the body, for example if a woman's breasts are to be scanned for possible indication of malignancy or other disease manifested by temperature changes, the scanning mechanism 50 would be approximately parallel to the arm 47. Scans across a woman's breasts can be used for preliminary examinations, and if there are indications of more serious conditions, can be supplemented by a full thermogram. It should be noted that the marker pen 11 is just as useful as in the forehead scans described above, and marks can be made at various points in the scan, for example the nipples of the woman's breast and any other point which is of interest for thermographic diagnostic purposes. Diagnosis follows along the same line as with a thermogram, most malignancies, for example, showing up as hotter spots, although there are a few exceptional situations where they may be colder. The record, of course, is not a thermogram in shades of gray, but a graph of varying temperature on the chart paper. For women who are not using the type of hormone oral contraceptive which reproduces some of the conditions of pregnancy and therefore prevents ovulation, it is also possible to use the scan to determine whether the women is pregnant. After a few weeks, two to three, the breasts, which are normally somewhat cooler than the rest of the woman's torso because of the insulating fat, become warmer under the effects of the hormones of pregnacy, and of course this shows up on the scan. With the increasing use of the type of oral contraceptive which causes the same temperature changes in breasts as does pregnancy itself, the use of the modification of the present invention represented by FIG. 5 for determination of pregnancy will not be as often useful, but it is described as another indication of the great versatility of the instrument of the present invention. Sometimes for breast scans a still larger and longer cone 15 is used.

Still considering FIG. 5, it is sometimes desirable to effect scans along the spine or immediately adjacent to it, and down a leg where vascular blockage is suspected. In such a case the scanning mechanism 50 is turned at right angles to the arm 47, and the scan effected in this direction, with, of course, suitable adjustment of the scan length for the particular scan used. Again, positions can be marked by the marker pen 11 as described above. As shown in FIG. 5 the radiometer is vertical. A suitable radiometer bracket (not shown) can also permit aiming the radiometer horizontally.

When scans are to be made with the remote scanning device of FIG. 5, the procedure is essentially the same as has been described in detail in connection with FIGS. 1–4 for forehead scanning. That is to say, there may be a preliminary scan to determine the temperatures to be encountered, the range control 27 set to the suitable range, and the chart response matched with the points on the meter as has been described. The scan then proceeds in the same manner as with the forehead scan, but of course, in many cases the length of the scan will be very much longer, and so longer pieces of chart paper will be produced. As in the case of forehead scans, the scan record is preferably the same length as the skin scanned. It is an evidence of the versatility of the present invention that the same general type of instruments can be used for these scans of very different lengths, and marking of positions or points of thermographic interest can be effected in the same manner.

The production of a record on moving paper has been described particularly in conjunction with a record which shows the variation of temperature with positions in a scan. This is the most important general field of utility for the present invention. However, it is possible to connect the instrument so that it will trace a line representing the temperature measured by a radiometer which does not move, in other words a graph of change of temperature of a single location with time. As has been described above, this type of record is produced when function knob 13 is set to the "Paper Feed" position, in which position the radiometer is not scanned but remains pointed at a single spot. The radiometer can remain attached to the main part of the instrument and moved to the proper position or, of course, the radiometer can be detached from its scanning mechanism.

Reference has been made above to the fact that normally the main power switch 4 is actuated some time before the scans are effected in order to bring radiometer and associated circuits to the desired equilibrium. That equilibrium is needed is a well known and inherent characteristic of infrared radiometers, and is, of course, not changed by the scanning and recording mechanisms which form a part of the present invention.

When the instrument of the present invention is to be used primarily in a doctor's office or at some other fixed location, ordinarily it will always be operated with 110 v. line power. However, sometimes it is desirable to move the machine, for example to a hospital ward, and in such a case the radiometer and its circuits would cool off and it would be necessary to wait until equilibrium temperature is again reached. This can be easily taken care of by providing on the lower shelf of the table storage batteries shown in FIG. 4 at 52. They operate through an inverter to produce 110 volts of the desired current range. As the inverter is a standard design, it is not shown. The battery power supply also is provided with suitable rectifier of standard design, which is also not shown, and which charges the battery when the device is used in connection with the normal power lines. When the power cord of the instrument is removed from the 110 v. supply and plugged into the socket from the inverter, it immediately turns battery power on and there is no cooling off of the radiometer and therefore it can be used promptly. The batteries are normally sufficient for from 3 to 4 hours use, and it will be rare that portable use for longer periods of time would be necessary. The possibility of using an auxiliary battery supply, while not necessary to the operation of the instrument as such, is a convenient additional feature which is included in a preferred aspect, although in broader aspects the instrument is not limited to such provision.

We claim:

1. In a scanning device for single-line scanning of the infrared emission from the skin of animals which is provided with an infrared radiometer having means for imaging a restricted field of view and means for moving said infrared radiometer back and forth in a single linear predetermined path, the improvement which comprises
   (a) a meter for measuring signal output from the radiometer,
   (b) a recording device of the moving surface-moving pen type having an input,
   (c) signal generating means for generating a signal in the range of normal recorder input signals,
   (d) multiple switching means connecting radiometer signal output to the meter, each of five switching positions connecting radiometer output signal to the meter, in the second and fifth switching positions also connecting power to the radiometer scanning means, in said fifth position radiometer output signal also being connected to the recording means, and in one position actuating recorder paper-moving means without scanning,
   (e) means for varying the signal generator output in a third switching position whereby meter response can be changed,
   (f) multiple potentiometer means for selecting recorder range and low-temperature starting point of each range,
   (g) means for moving recorder recording pen to track with meter readings and to place recorder pen at one meter read temperature at one extreme side of the recording surface of the recorder, whereby at least some or all of the following functions can be performed, measuring skin temperature on the meter without scanning, scanning and measuring skin temperature on the meter during the scan, setting a recorder temperature range and lower temperature thereof, calibrating in one position of the multiple position switching means by varying the signal generator outputs until the meter registers the highest temperature in the range, moving the recorder pen to an extreme edge of the recording surface, simultaneously scanning and recording, and moving recording surface without recording.

2. A device according to claim 1 in which means are provided for marking on one edge of the recording surface during a scan, said means comprising a second pen and electrically operated actuating means for causing it to contact the recording surface.

3. A device according to claim 2 in which radiometer signal output and multiple switching means are connected through a detachable cable and means are provided for remote scanning over a patient in a supine position.

4. A device according to claim 1 in which radiometer signal output and multiple switching means are connected through a detachable cable and means are provided for remote scanning over a patient in a supine position.

5. A device according to claim 1 in which all elements are incorporated into a single unitary structure and the radiometer scanning path is along the top of said structure, whereby scanning of the forehead of a seated patient can be effected.

6. A device according to claim 2 in which all elements are incorporated into a single unitary structure and the radiometer scanning path is along the top of said structure, whereby scanning of the forehead of a seated patient can be effected.

7. A device according to claim 6 in which the radiometer is detachably mounted on the scanning means in a predetermined position with respect to the scanning path.

8. A device according to claim 5 in which the radiometer is detachably mounted on the scanning means in a predetermined position with respect to the scanning path.

References Cited

UNITED STATES PATENTS

| | | | |
|---|---|---|---|
| 1,901,209 | 3/1933 | Vayda | 73—355 XR |
| 2,804,069 | 8/1957 | Schwamm et al. | 128—2 |
| 2,895,049 | 7/1959 | Astheimer et al. | 250—65 |
| 3,245,402 | 4/1966 | Barnes | 128—2 |
| 3,306,282 | 2/1967 | Pierce | 128—2 |
| 3,335,716 | 8/1967 | Alt et al. | 128—2 |
| 3,339,542 | 9/1967 | Howell | 128—2 |
| 3,374,354 | 3/1968 | Hood | 250—83.3 |

OTHER REFERENCES

Military Medicine, 1962, vol. 127, pp. 242–246.

RICHARD A. GAUDET, Primary Examiner

K. L. HOWELL, Assistant Examiner

U.S. Cl. X.R.

73—355; 128—2